(12) United States Patent
Koyata et al.

(10) Patent No.: US 7,724,413 B2
(45) Date of Patent: May 25, 2010

(54) SPECKLE REMOVING LIGHT SOURCE AND LIGHTING APPARATUS

(75) Inventors: Yasuharu Koyata, Tokyo (JP); Yoshihito Hirano, Tokyo (JP); Kiyohide Sakai, Tokyo (JP); Masao Imaki, Tokyo (JP); Shinsuke Shikama, Tokyo (JP); Jiro Suzuki, Tokyo (JP); Takao Endou, Tokyo (JP); Kouhei Teramoto, Tokyo (JP); Shigenori Shibue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 138 days.

(21) Appl. No.: 11/920,916

(22) PCT Filed: Jul. 11, 2005

(86) PCT No.: PCT/JP2005/012737

§ 371 (c)(1),
(2), (4) Date: Nov. 21, 2007

(87) PCT Pub. No.: WO2007/007389

PCT Pub. Date: Jan. 18, 2007

(65) Prior Publication Data

US 2009/0080054 A1    Mar. 26, 2009

(51) Int. Cl.
*G02B 26/00* (2006.01)
(52) U.S. Cl. .................. 359/238; 359/242; 359/278
(58) Field of Classification Search ................ 359/238
See application file for complete search history.

(56) References Cited

U.S. PATENT DOCUMENTS 3,588,217 A    6/1971   Mathisen

| 6,577,429 | B1 * | 6/2003 | Kurtz et al. ................. 359/279 |
| 7,152,795 | B2 * | 12/2006 | Tsikos et al. ........... 235/462.01 |
| 2007/0041420 | A1 | 2/2007 | Imaki et al. |
| 2008/0143888 | A1 * | 6/2008 | Chilla et al. ................. 348/759 |

(Continued)

FOREIGN PATENT DOCUMENTS

JP      5-187839 A    7/1993

(Continued)

OTHER PUBLICATIONS

Machine translation of JP05-187839 Jul. 27, 1993.*

(Continued)

*Primary Examiner*—Jessica T Stultz
(74) *Attorney, Agent, or Firm*—Birch, Stewart, Kolasch & Birch, LLP

(57) ABSTRACT

Provided are a speckle removing light source capable of removing speckle by using laser light whose wavelength is temporally changed and a lighting apparatus for producing an image from which the speckle is removed. Included are a light source for outputting laser light, and a light frequency modulator for temporally changing a wavelength of the laser light. The light frequency modulator has a predetermined period set for changing the wavelength of the laser light. Also, provided is a lighting apparatus, including a spatial light modulator illuminated with the laser light outputted from the speckle removing light source to produce an image. The spatial light modulator has a period set for producing the image, which is longer than the period for changing the wavelength of the laser light by the light frequency modulator.

12 Claims, 7 Drawing Sheets

U.S. PATENT DOCUMENTS

2009/0005961 A1 * 1/2009 Grabowski et al. .......... 701/200

FOREIGN PATENT DOCUMENTS

| JP | 11-251681 A | 9/1999 |
|---|---|---|
| JP | 2002-323675 A | 11/2002 |
| JP | 2002-541526 A | 12/2002 |
| JP | 2004-341299 A | 12/2004 |
| WO | WO-2004-102752 A1 | 11/2004 |

OTHER PUBLICATIONS

Saloma et al., "Speckle reduction by wavelength and space diversity using a semiconductor laser," Applied Optics, vol. 29, No. 6, 1990, pp. 741-742.

* cited by examiner

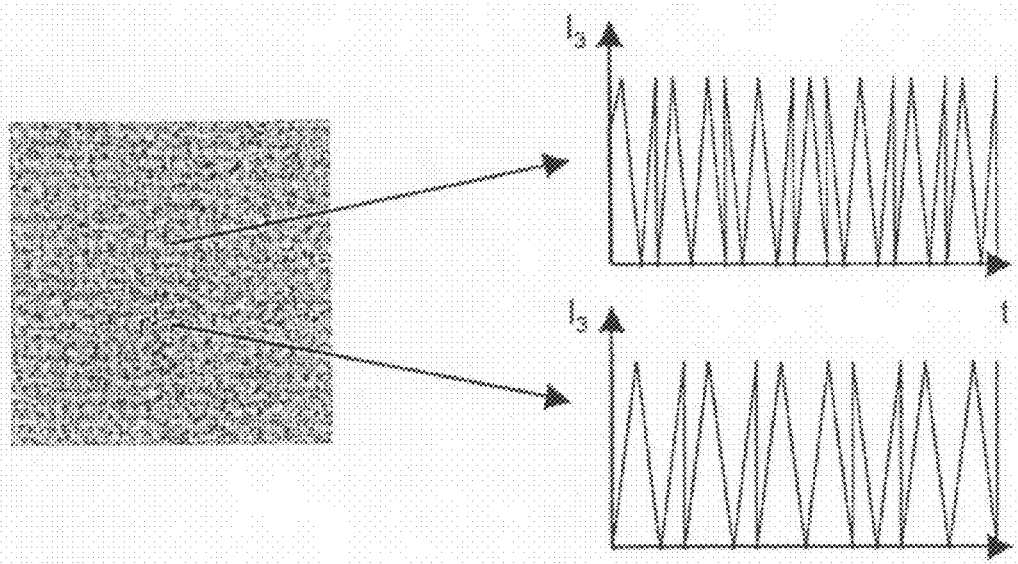

SPECKLE REMOVING LIGHT SOURCE AND LIGHTING APPARATUS

TECHNICAL FIELD

The present invention relates to a light source for removing speckle and a lighting apparatus using the light source, and more particularly, to a technique for removing speckle observed in a light beam of a laser in a projection type display in which the laser is used as the light source and a liquid crystal or a digital micromirror device (DMD) is used as a spatial light modulating means.

BACKGROUND ART

Various types of projection type displays are currently used as image display devices for consumer TV, presentation, industry, large theater, and the like. In general, light is emitted to a spatial light modulating means called a light valve (optical valve) to form an image and then light passing therethrough or light reflected thereon is projected to an auxiliary surface such as a screen to display the image.

Up to now, this type of projection type display has a generally employed structure in which a lamp light source for the projection type display is replaced by a laser light source to make it possible to widen a color reproduction range obtained by a monochromatic spectrum, increase a contrast by light source intensity modulation, lengthen the life using a semiconductor laser or the like, and reduce a size of an optical system in view of light directivity, thereby obtaining performance which is significantly higher than that of the conventional lamp light source (see, for example, Patent Document 1). Note that an optical system for lighting the light valve with light emitted from a light source is called a lighting optical system and an optical system for enlarging and projecting a light beam emitted from the light valve is called a projection optical system.

When laser light is emitted to the light valve and projected to the screen, a light and dark spot pattern, which is called speckle, appears on an image. This is because, the laser light which is spatially and temporally coherent light is reflected on an optically rough surface or passes therethrough to become light having a different phase, so the light having the different phase is observed as interference light by human's eyes. The speckle becomes an image noise component and thus this is not preferable for an observer.

An example of a method of removing the speckle includes a method of coupling light from a laser light source to a multimode optical fiber and vibrating the optical fiber to cause a mode scramble (see, for example, Patent Document 2). According to this method, speckle patterns change. When the speckle patterns are superimposed on one another, speckles are averaged and reduced. However, a mechanical apparatus for vibrating the optical fiber is required. The durability of the mechanical apparatus and the optical fiber to be vibrated become a problem. The optical fiber having the circular cross sectional shape generates a skew component along the circumferential direction. Therefore, a spatial bias of the speckle pattern is large, so the speckles cannot be sufficiently removed.

On the other hand, another method of removing the speckle is a method of modulating an injection current of a semiconductor laser to set a multiwavelength oscillation mode for the semiconductor laser and performing spatial spectroscopy by an optical system using a diffraction grating (see, for example, Non-patent Document 1). Therefore, multiwavelength speckle patterns generate. When the speckle patterns are superimposed on one another, the speckles are averaged and reduced. However, the alignment adjustment of the optical system using the diffraction grating is complicated, so an apparatus becomes larger and expensive.

Another method of removing the speckle is a method of injecting a radio frequency signal to set the multiwavelength oscillation mode for a semiconductor laser (see, for example, Patent Document 3). In addition, the multiwavelength oscillation mode is set for the semiconductor laser by optical feedback using an optical fiber pigtail.

Further, a laser wavelength is shifted by Doppler shift with an acousto-optic modulator. Accordingly, a large number of different speckle patterns generate. When the speckle patterns are superimposed on one another, the speckles are averaged and reduced.

However, the spatial spectroscopy is not performed. In addition, when only a wavelength is changed, a change in phase between laser beams having a very small optical path length difference is small and speckle cannot be sufficiently removed. The spectral spread of the semiconductor laser which is caused by the multiwavelength oscillation mode is a non-uniform intensity distribution, so a spectral pattern whose intensity is large is included therein. Therefore, speckle cannot be sufficiently removed.

Patent Document 1: U.S. Pat. No. 5,634,704 B

Patent Document 2: U.S. Pat. No. 3,588,217 B

Patent Document 3: JP 2002-323675 A

Non-patent Document 1: Caesar Saloma et. al., Appl. Opt. Vol. 29, No. 6, p. 741-742

DISCLOSURE OF THE INVENTION

Problems to be Solved by the Invention

The present invention has been made in view of the above-mentioned points and an object of the present invention is to provide a speckle removing light source capable of removing speckle by using laser light whose wavelength is temporally changed.

Another object of the present invention is to provide a lighting apparatus for illuminating a spatial light modulating means with the laser light to produce an image from which speckle is removed.

Means for Solving the Problems

A speckle removing light source according to the present invention includes: a light source for outputting laser light; and light frequency modulation means for changing a wavelength of the laser light. In the speckle removing light source, the wavelength of the laser light outputted from the light source is temporally changed by the light frequency modulation means, and the light frequency modulation means has a predetermined period set for changing the wavelength of the laser light.

A lighting apparatus according to the present invention includes spatial light modulating means illuminated with the laser light outputted from the speckle removing light source to produce an image. In the lighting apparatus, the spatial light modulating means has a period set for producing the image, and the period is longer than the period for changing the wavelength of the laser light by the light frequency modulation means.

EFFECTS OF THE INVENTION

According to the present invention, the speckle can be removed by using the laser light whose wavelength is temporally changed.

The image from which the speckle is removed can be produced by illuminating the spatial light modulating means with the laser light outputted from the speckle removing light source.

BRIEF DESCRIPTION OF THE DRAWINGS

FIG. 7 is an explanatory diagram showing speckle components observed as intensity unevenness components at different locations.

BEST MODE FOR CARRYING OUT THE INVENTION

Hereinafter, in order to explain the present invention in more detail, preferred embodiments of the present invention will be described with reference to the drawings.

Embodiment 1

Figure 1:
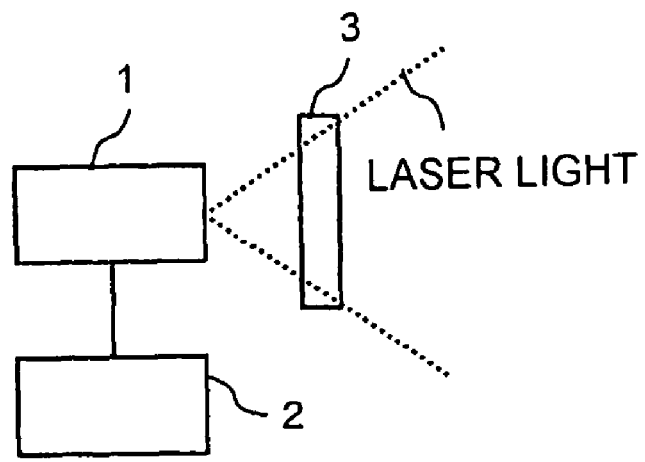
FIG. 1 is a structural diagram showing a speckle removing light source and a lighting apparatus according to Embodiment 1 of the present invention.

FIG. 1 is a structural diagram showing a speckle removing light source and a lighting apparatus according to Embodiment 1 of the present invention.

The speckle removing light source and the lighting apparatus according to Embodiment 1 of the present invention includes a light source, a light frequency modulation means, and a spatial light modulating means.

The speckle removing light source includes a light source 1 for outputting laser light and a light frequency modulation means 2 for adjusting a wavelength of the laser light outputted from the light source 1. The lighting apparatus includes the speckle removing light source and a spatial light modulating means 3 for producing an image using illumination light.

In FIG. 1, a laser in which a semiconductor laser or a solid laser is wavelength-converted by a nonlinear optical material, the semiconductor laser itself, or the like can be used as a light source 1. Outputted laser light has a visible wavelength in a range of approximately 400 nm to 700 nm. For example, the light source is a semiconductor laser which is made of a semiconductor mixed crystal of an InGaAs system compound and has a wavelength of 630 nm, a wavelength conversion laser having a wavelength of 532 nm in which a solid laser made of an Nd:YAG laser medium is wavelength-converted by a nonlinear optical material of MgO:LiNbO$_3$, or a wavelength conversion laser having a wavelength of 473 nm in which the semiconductor laser made of the semiconductor mixed crystal of the InGaAs system compound is wavelength-converted by the nonlinear optical material of MgO:LiNbO$_3$. In this case, the laser light outputted from the light source has a single mode, which is a longitudinal mode, and has a single wavelength.

The light frequency modulation means 2 is classified into an internal modulation type and an external modulation type. The internal modulation type is a type for applying an external force to constituent components of the light source, that is, a medium inserted in a laser resonator, a laser medium, an excitation power source, or the like to perform modulation. On the other hand, the external modulation type is a type for modulating the laser light outputted from the light source while the light source itself is regularly operated.

Figure 2:
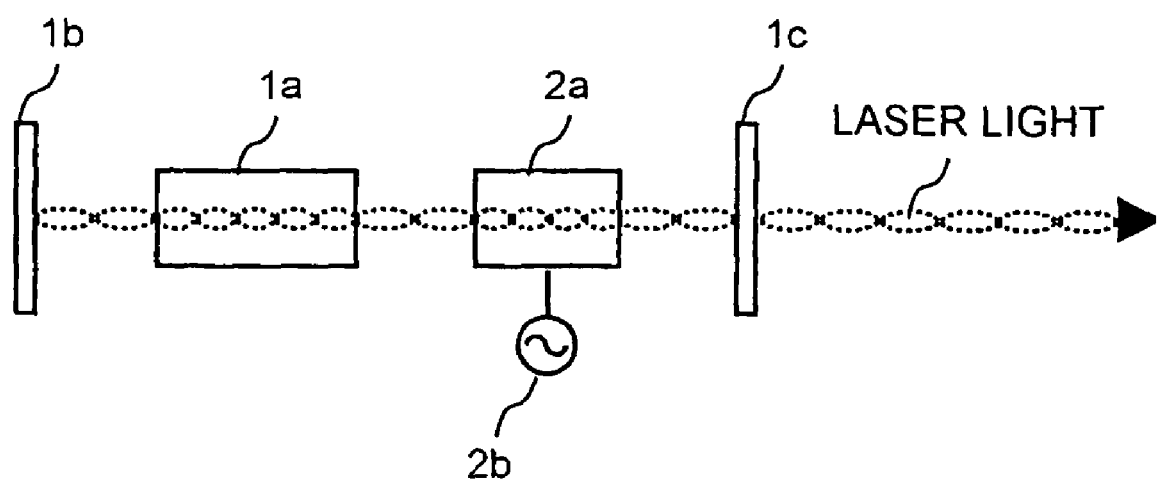
FIG. 2 is a structural diagram of a light frequency modulation means of an internal modulation type.

For example, in the internal modulation type, as shown in FIG. 2, a modulation medium 2a having an electrooptical effect is provided in a laser resonator which includes a laser medium 1a of the light source and two reflecting mirrors 1b and 1c. An electric field is applied from a voltage source 2b to the modulation medium to change a refractive index of the medium.

Therefore, a resonator length of the laser changes, so an oscillation light frequency can be changed. A strength of the electric field is modulated to temporally change the light frequency. LiNb$_3$ or LiTaO$_3$ is used as the modulation medium having the electrooptical effect. When the light source is a semiconductor laser itself, the oscillation light frequency of the semiconductor laser can be temporally changed by the modulation of an injection current.

Figure 3:
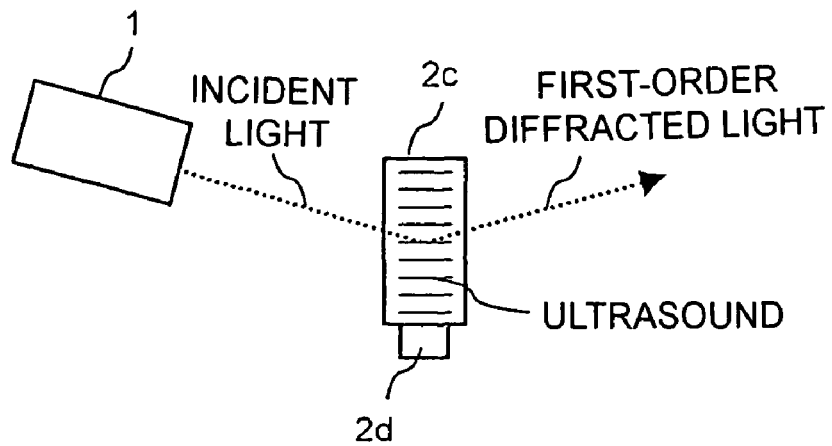
FIG. 3 is a structural diagram of a light frequency modulation means of an external modulation type.

In the external modulation type, as shown in FIG. 3, laser light propagates through a modulation medium 2c having an acousto-optic effect. When ultrasound generated by a piezoelectric element 2d propagates through the modulation medium, compression and extension occur in the modulation medium, a diffraction grating is caused by a layer whose refractive index is periodical.

As a result, intense first-order diffracted light generates in a direction in which a Bragg condition is satisfied and the light frequency of the laser light can be changed by Doppler shift.

An acoustic frequency of the ultrasound is modulated to temporally change the light frequency.

Tellurite glass, PbMoO$_4$, or the like is used as the modulation medium the having the acousto-optic effect. A period for changing by the wavelength of the laser light by the light frequency modulation means is set to 20 msec. or less.

In a spatial light modulating means 3, a liquid crystal, a digital micromirror device (DMD), or the like can be used as a modulation medium. According to a system using the liquid crystal, a liquid crystal material is sandwiched by glass substrates or the like to produce an element. An electric field is applied from the outside to the element to produce an image based on a change in optical characteristic of the element, which is caused, by a change in molecular alignment of the liquid crystal.

According to a system using the DMD, micromirrors produced by a micro electro mechanical systems (MEMS) technique are two-dimensionally arranged and tiled to perform ON/OFF driving, thereby producing an image. A period for producing the image by the spatial light modulating means is set to be longer than the period for changing the wavelength of the laser light by the light frequency modulation means.

Next, the operation will be described.

The light frequency of laser light outputted from the light source 1 is temporally continuously changed by the light frequency modulation means 3. The laser light is emitted to the spatial light modulating means 3. The spatial light modulating means 3 changes the optical characteristics of a device in response to an input signal and locally modulates a beam of the emitted laser light to produce an image. Transmission light or reflection light (transmission light of FIG. 1) from the spatial light modulating means 3 is projected to an auxiliary surface such as a screen to display the image. At this time, speckle is removed.

Next, a method of removing speckle will be described.

Assume that light beams from an arbitrary point follow two different paths and interfere with each other at a certain point.

With respect to speckle, spatially and temporally coherent laser light is reflected on an optically rough surface such as an object plane (for example, screen) or passes therethrough to become light beams having different phases, so different phase interference is observed on an image plane (by, for example, human eye).

Figure 4:
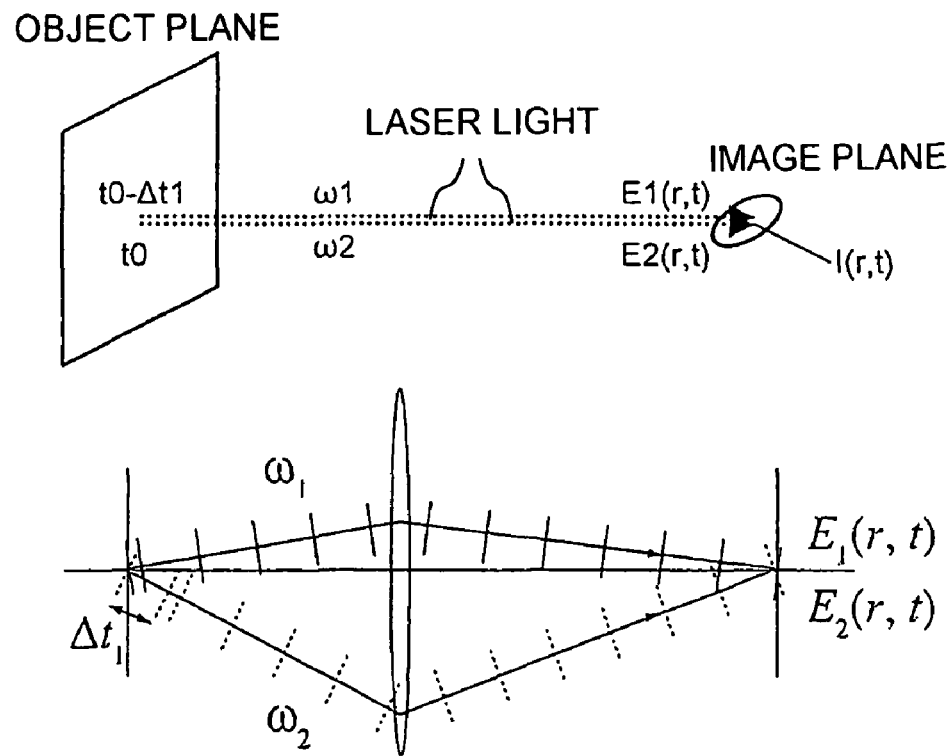
FIG. 4 are explanatory views showing a method of removing speckle, which shows electric fields E1 and E2 of two laser light beams which interfere with each other.

As shown in FIG. 4, electric fields E1 and E2 of two laser light beams which interfere with each other are expressed by Expressions (1) and (2), respectively.

[Expressions 1]

$$E_1(r,t) = A_1(r)\exp[i\omega_1 t + i\phi_1(r)] \quad (1)$$

[Expressions 2]

$$E_2(r,t) = A_2(r)\exp[i\omega_2 t + i\phi_2(r)] \quad (2)$$

Here, r denotes a position on a human eye (image plane), t denotes an observation time, ω1 and ω2 denote frequencies of the respective laser light beams at the time t, and φ1 and φ2 denote initial phases of the respective laser light beams at the position r.

An intensity I of the superimposed two laser light beams is expressed by Expression (3).

[Expressions 3]

$$I(r,t) = |E_1(r,t) + E_2(r,t)|^2 \quad (3)$$
$$= |A_1(r)|^2 + |A_2(r)|^2 +$$
$$2\text{Re}[A_1(r) \cdot A_2^*(r)\exp[i\{(\omega_1 - \omega_2)t + \phi_1(r) - \phi_2(r)\}]]$$

$$\Delta\psi(r,t) = (\omega_1 - \omega_2)t + \phi_1(r) - \phi_2(r) \quad (4)$$

$$I_3(r,t) = 2\text{Re}[A_1(r) \cdot A_2^*(r)\exp\{i \cdot \Delta\Psi(r,t)\}] \quad (5)$$

Figure 5A:
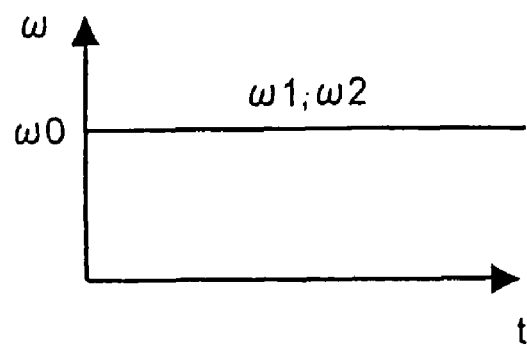
FIG. 5A is an explanatory diagram showing an intensity I of superimposed two laser light beams in a case where wavelengths of the laser light beams (light frequencies) are equal to each other ($\omega 1 = \omega 2$).
Figure 5B:
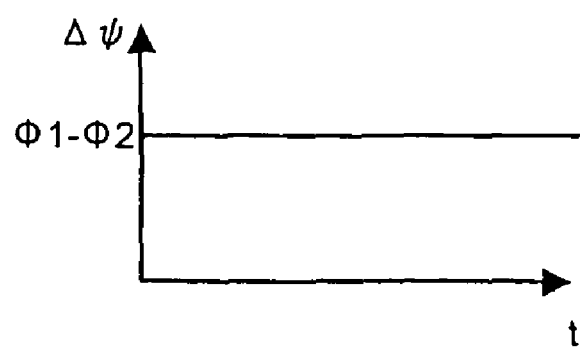
FIG. 5B is an explanatory diagram in a case where there is a static speckle component given by an initial phase difference ($\phi 1 - \phi 2$).
Figure 5C:
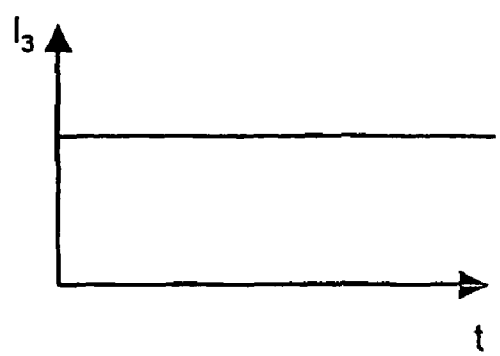
FIG. 5C is an explanatory diagram in a case where an interference intensity $I_3$ does not temporally change and is static.

As shown in FIGS. 5A to 5C, if the wavelengths of the laser light beams (light frequencies) are equal to each other (ω1=ω2) (see FIG. 5A), a phase Δψ of Expression (4) includes only a static speckle component given by an initial phase difference (φ1−φ2) (see FIG. 5B), so an interference intensity I$_3$ of Expression (5) does not temporally change and thus is static (see FIG. 5C).

Figure 6A:
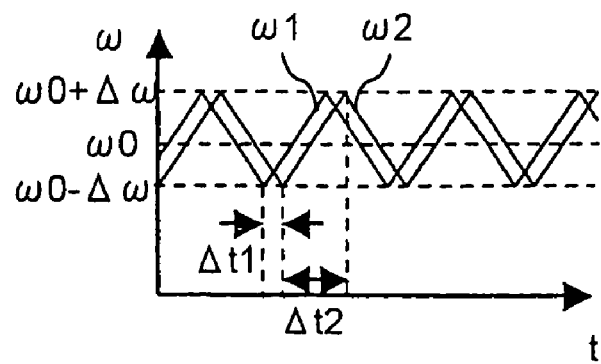
FIG. 6A is an explanatory diagram showing a case where the wavelengths of the laser light beams (light frequencies) are temporally changed, which shows an example in which the frequencies are changed according to a time in a range of $\omega 0 \pm \Delta \omega$.
Figure 6B:
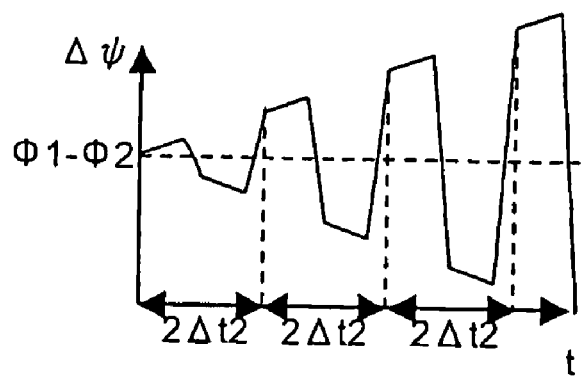
FIG. 6B is an explanatory diagram showing an example in which a period at which a speckle pattern of the entire image plane temporally changes is a period ($2 \Delta t2$) at which a light frequency of a light source changes.
Figure 6C:
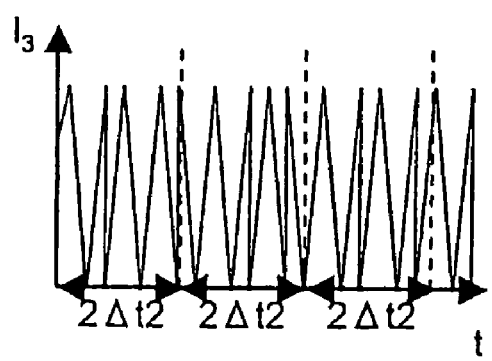
FIG. 6C is an explanatory diagram showing a case where the interference intensity $I_3$ temporally changes.

On the other hand, as shown in FIGS. 6A to 6C, the case where the wavelengths of the laser light beams (light frequencies) are temporally changed is assumed. FIG. 6A shows an example in which the frequencies are changed according to a time in a range of ω0±Δω. In the example of FIG. 6A, the period is simply changed based on a triangular wave. Therefore, when a frequency at a certain time is expressed by ω1 and a frequency after a lapse of Δt1 from the time is expressed by ω2, ω2(t)=ω1(t−Δt1) is held.

As shown in FIG. 4, the case where light beams from an arbitrary point follow two different paths and interfere with each other at a certain point is assumed. In such a case, the paths of the two laser light beams are different from each other, so propagation times (optical path lengths) are different from each other. The light beam having the frequency ω1 at an arbitrary time and the light beam having the frequency ω2 after a lapse of a propagation time difference Δt1 begin to travel from the arbitrary point at different times. However, the light beams travel on the different paths, so there is the propagation time difference Δt1 (or optical path length difference cΔt1). Therefore, the light beams reach the certain point at the same time and interfere with each other.

The phase Δψ of Expression (4) includes the static speckle component given by the initial phase difference (φ1−φ2) and a beat frequency component changed by a product of a light frequency difference (ω1−ω2) and the time t. The interference intensity I$_3$ of Expression (5) is temporally changed by the new latter component.

The reason why light can be recognized as a stable image by a human is that, the visual sense to light stimulation is maintained for a predetermined period, and the sense that simultaneous shinning occurs is produced when a stimulus further reaches another location of a visual field during the period. At this time, if a subsequent light stimulus reaches the same location, the strengths of the sense are added to each other (integrated).

According to a method of providing two light stimuli at a short time interval, adjusting the strength of a light stimulus, and determining a threshold in which the light stimulus is sensed, it is found that the two stimuli are completely added to each other and thus become equal to a single light stimulus at a time interval of up to approximately 20 ms. Therefore, the speckle patterns are temporally averaged and the speckle can be removed by a temporal addition effect (time integration effect).

A period at which a speckle pattern of the entire image plane temporally changes is a period (2Δt2) at which the light frequency of the light source changes in the example of FIG. 6B. When the speckle pattern is sufficiently averaged on one image produced by the spatial light modulating means 3, a preferable image can be observed without the reorganization of speckle. Therefore, the phase Δψ is desirably changed by 2π or more during a time period for which an image is displayed. Therefore, a period at which the wavelength of the laser light is changed by the light frequency modulation means 3 is equal to or smaller than an image production period of the spatial light modulating means and set to 20 ms or less.

It is desirable to significantly change the interference strength in the speckle pattern of the entire image plane at a time interval of 20 ms or less. A change in time of the interference intensity becomes larger as a change in time of the phase Δψ, that is, the beat frequency (ω1−ω2) increases. In order to increase the beat frequency (ω1−ω2), it is desirable to increase a time change rate (first order derivative, gradient) of the frequency or the time Δt1 because the following can be developed on the assumption of the origin shift of the time Δt1 which is ω2(t)=ω1(t−Δt1).

$$\omega 1(t) - \omega 2(t) = \omega 1(t - \Delta t1) - \omega 1(t)$$
$$= \omega 1(t) - \frac{\partial \omega}{\partial t \Delta t1} - \omega 1(t)$$
$$= -\frac{\partial \omega}{\partial t \Delta t1}$$

Therefore, when a time change rate of the wavelength temporally changed by the light frequency modulation means 3 increases or when the propagation time difference Δt1 (optical path length difference cΔt1) increases, the speckle can be efficiently removed.

When the laser light outputted from the light source 1 has a longitudinal mode which is a multimode, for example, there is a case where a mode ω1(t) is equal to another mode ω2(t), ω1(t)=ω2(t) because of a change in wavelength of the laser light which is caused by the light frequency modulation means 3. In this case, the beat frequency component which changes with time is eliminated because of the same wavelength. Accordingly, a problem in that the interference intensity contains only the static speckle component occurs.

For the above-mentioned reason, in order to remove the speckle by temporally changing and temporally averaging the speckle, a change in frequency of the longitudinal mode which is a single mode or the multi mode desirably does not overlap with that of another mode.

The speckle is normally associated with intensity unevenness at different locations as shown in FIG. 7. This is a static speckle component given by an initial phase difference (φ1(r)−φ2(r)), which has a difference value at each point r on the image plane, so the speckle is observed as static intensity unevenness. In the case where the beat frequency component is generated to temporally change the speckle pattern as described above and the speckle can be temporally averaged at an arbitrary point r, the speckle is temporally averaged also at another position r'.

Therefore, the speckle is averaged at the arbitrary position on the image plane, so a uniform image can be obtained on the image plane.

The light frequency modulation means 2 adjusts the wavelength of the laser light while the intensity thereof is held to a substantially constant value. Therefore, the intensity of the laser light to the wavelength thereof is constant, so the speckle can be removed without causing large intensity unevenness from interference from an arbitrary wavelength of the laser light.

The light frequency modulation means 2 adjusts the wavelength of the laser light based on a triangular wave. The wavelength may be adjusted based on a sinusoidal wave. The interference intensity is temporally continuously changed, so the speckle can be removed.

The speckle removing light source includes the light source 1 and the light frequency modulation means 2, so the apparatus can be reduced in size and cost.

According to such a structure, even when the laser light is projected to an auxiliary surface such as a screen, the speckle pattern temporally changes, so the speckle removing light source and the lighting apparatus capable of efficiently removing the speckle are obtained.

Embodiment 2

A speckle removing light source and a lighting apparatus according to Embodiment 2 of the present invention includes a light source, a light frequency modulation means, a multimode optical fiber, and a spatial light modulating means.

Figure 8:
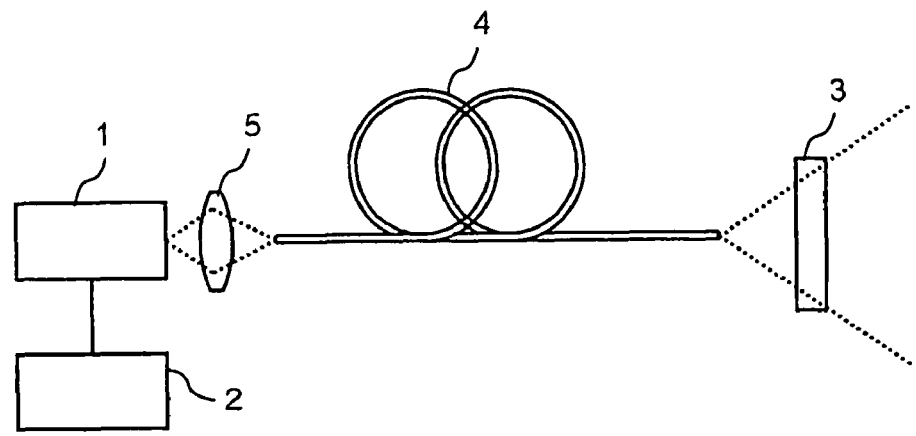
FIG. 8 is a structural diagram showing a speckle removing light source and a lighting apparatus according to Embodiment 2 of the present invention.

FIG. 8 is a structural diagram showing the speckle removing light source and the lighting apparatus according to Embodiment 2 of the present invention. The speckle removing light source includes the light source 1 for outputting laser light, the light frequency modulation means 2 for adjusting the wavelength of the laser light, and a multimode optical fiber 4 in which light propagates through an internal core and the number of optical modes is equal to or larger than two. The lighting apparatus includes the speckle removing light source and the spatial light modulating means 3 for producing an image using illumination light.

The above-mentioned structures are similar to those of the speckle removing light source and the lighting apparatus as shown in FIG. 1 and have the similar functions to those of the speckle removing light source and the lighting apparatus as shown in FIG. 1 unless otherwise specified.

Figure 9:
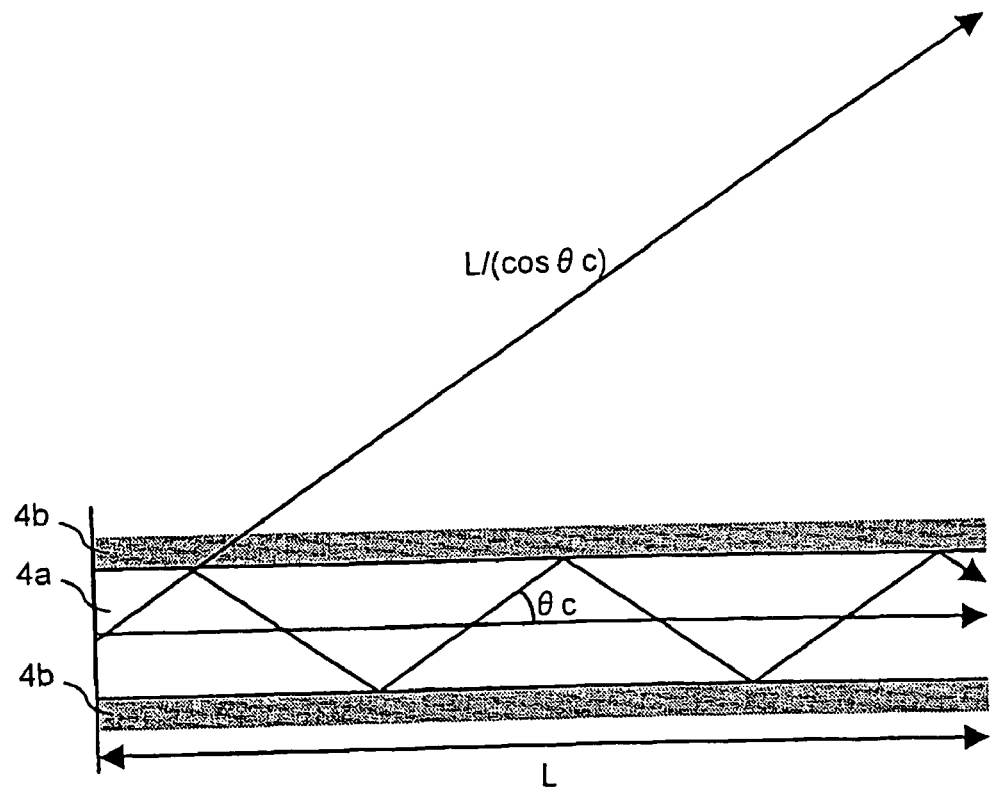
FIG. 9 is an explanatory diagram showing a core and a clad of a multimode optical fiber 4.

As shown in FIG. 9, the multimode optical fiber 4 includes a core 4a for propagating light at the center of the lateral cross section thereof. A diameter of the core is approximately several tens μm to several hundreds μm. A clad 4b for totally reflecting light is located around the core and has a refractive index lower than that of the core.

Next, the operation will be described.

The frequency of laser light outputted from the light source 1 is temporally continuously changed by the light frequency modulation means 2. The laser light is condensed by a lens 5 and then incident on the multimode optical fiber 4. A numerical aperture NA of the laser light incident on the multimode optical fiber 4 is equal to or smaller than a numerical aperture NA of light capable of propagating through the optical fiber and a beam size thereof is equal to or smaller than a core size of the optical fiber. In such conditions, the laser light outputted from the light source 1 is directly incident on the multimode optical fiber 4 and thus it is unnecessary to use the lens 5.

The laser light incident on the multimode optical fiber 4 propagates through the core 4a of the multimode optical fiber 4 and exits therefrom. The light is totally reflected, so the laser light can be propagated at high transfer efficiency.

The multimode optical fiber 4 has a large number of modes capable of propagating light. A propagation angle of the highest mode is substantially equal to a total reflection angle. When the propagation angles of modes are assumed to be substantially continuously distributed in a range of 0 to the total reflection angle, the number of modes is equal to or larger than several hundreds to several thousands.

The multimode optical fiber 4 is bent at long scale lengths in the longitudinal direction, so the number of reflection is sufficient. The incident laser light is distributed into a plurality of modes and propagates through the multimode optical fiber 4. The lowest mode (fundamental mode) of the multimode optical fiber 4 has a very small propagation angle and propagates substantially parallel to the optical axis of the optical fiber, so the fundamental mode reaches the exit end at the earliest time.

On the other hand, the propagation angle of the highest mode is substantially equal to a total reflection angle θc, so, as shown in FIG. 9, the highest mode equivalently propagates over a distance longer than that of the fundamental mode by 1/cos θc times. Therefore, a propagation time difference Δt between the fundamental mode and the highest mode in a case where the fundamental mode propagates over a distance L is expressed by the Expression (6). Herein, n1 denotes a refractive index of the core and c denotes a light speed.

[Expression 4]

$$\Delta t = \frac{n1 \cdot L}{c} \cdot \left( \frac{1}{\cos \theta_c} - 1 \right) \quad (6)$$

Thus, when the laser light propagates through the multimode optical fiber 4, the propagation time difference Δt is caused between difference modes and increased proportional to a length L of the fiber.

In a case of laser light beams from two points located close to each other on an object plane, a difference between optical path lengths thereof to the image plane is small, so the propagation time difference Δt is small. Even when the wavelengths of the laser light beams (light frequency) temporally change, the light frequency difference (ω1−ω2) between the laser light beams is small. Therefore, the change in time of the phase Δψ which is caused by the beam frequency component is small and a change in interference intensity on the image plane is small. In contrast to this, the laser light to be outputted from the multimode optical fiber 4 is produced with a state in which the propagation time difference Δt between the difference modes is increased by the fiber having the length L.

Therefore, in the case of the laser light beams from the two points located close to each other on the object plane, the propagation time difference Δt is significantly increased proportional to the length L of the fiber, so the change in interference intensity on the image plane becomes larger. Thus, the interference intensity temporally changes in a significant manner, so the speckle can be efficiently removed.

The multimode optical fiber 4 is bent at long scale lengths in the longitudinal direction, so the number of reflection is sufficient. The incident laser light is distributed into a plurality of modes and propagates through the multimode optical fiber 4. Therefore, a spatial intensity distribution of the laser light on the incident end surface of the multimode optical fiber 4 is a Gaussian distribution. On the other hand, spatial intensity distributions of the respective modes on the exit end surface of the multimode optical fiber are superimposed on one another and spatially averaged laser light exits therefrom.

The laser light exited from the multimode optical fiber 4 is emitted to the spatial light modulating means 3. Because of the uniform spatial intensity distribution of the exited laser light, the illuminated surface of the spatial light modulating means 3 can be irradiated with the laser light without unevenness.

The spatial light modulating means 3 changes optical characteristics of a device in response to an input signal, and locally modulates a beam of the emitted laser light to form an image. When transmission light or reflection light (transmission light in FIG. 8) from the spatial light modulating means 3 is projected to an auxiliary surface such as a screen, the speckle pattern temporally changes. Therefore, an image in which speckle is removed can be displayed. Further, the laser light is emitted to the illuminated surface of the spatial light modulating means 3 without unevenness. Thus, a uniform image can be displayed.

According to such a structure, even when the laser light is projected to an auxiliary surface such as a screen, the speckle pattern temporally changes, so the light source capable of efficiently removing the speckle is obtained.

Embodiment 3

A speckle removing light source and a lighting apparatus according to Embodiment 3 of the present invention includes a light source, a light frequency modulation means, a multimode optical fiber in which an outer diameter shape of a lateral cross section of a core is a substantially square shape, and a spatial light modulating means.

The above-mentioned structures are similar to those of the speckle removing light source and the lighting apparatus as shown in FIG. 8 and have the similar functions to those of the speckle removing light source and the lighting apparatus as shown in FIG. 8 unless otherwise specified.

Figure 10:
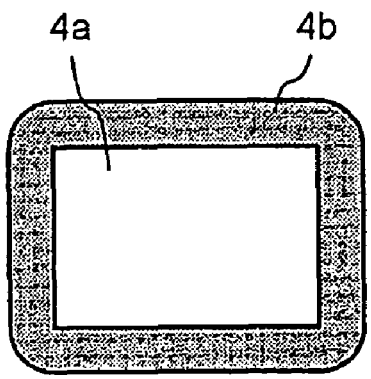
FIG. 10 is an explanatory view showing a lateral cross sectional structure of the multimode optical fiber 4.

FIG. 10 shows a lateral cross sectional structure of the multimode optical fiber 4. The multimode optical fiber 4 includes the core 4a for propagating light at the center of the lateral cross section thereof and an outer diameter shape thereof is a square shape. One side length of the square shape of the core is approximately several tens μm to several hundreds μm. The clad 4b for totally reflecting light is located around the core 4a and has the refractive index lower than that of the core 4a.

A method of manufacturing the multimode optical fiber 4 will be described.

The cylindrical rod material made of quartz is formed in the same manner as a known optical fiber preform manufacturing method such as an MCVD method, an OVD method, or a VAD method.

Figure 11:
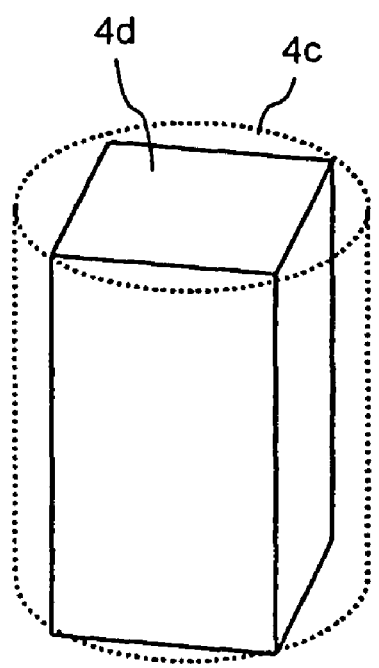
FIG. 11 is an explanatory view showing a method of manufacturing the multimode optical fiber 4.

Then, as shown in FIG. 11, the side surface of the cylindrical rod material 4c is polished, so the lateral cross section is formed in a substantially square shape in which arc shapes are removed from a circular shape along the circumference thereof, thereby producing a preform 4d of a core formation portion.

The produced preform 4d is set to a drawing machine and subjected to a drawing process for heating and drawing the preform 4d to reduce the diagonal diameter thereof. A heating temperature in the drawing process is set such that the core formation portion is formed as the core of the optical fiber by the drawing process while the outer diameter shape of the lateral cross section is substantially maintained.

Then, an acrylic resin solution to which a radical generating agent is added is deposited onto a surface of the drawn preform and irradiated with ultraviolet light to cure the solution, thereby forming the clad for coating and protecting the surface of the core.

Therefore, the multimode optical fiber 4 including the core 4a located at the center of the optical fiber and the clad 4b provided to coat the core 4a is manufactured.

Next, the operation will be described.

As in Embodiment 2, the frequency of laser light outputted from the light source 1 is temporally continuously changed by the light frequency modulation means 2. The laser light is condensed by the lens 5 and then incident on the multimode optical fiber 4. The laser light incident on the multimode optical fiber 4 propagates through the core 4a of the multimode optical fiber 4 and exits therefrom.

The outer diameter shape of the lateral cross section of the core of the multimode optical fiber 4 is the square shape. Therefore, a skew component along the circumferential direction of the optical fiber is reduced and the speckle pattern becomes spatially uniform, with the result that the speckle can be more effectively removed. The beam shape of the laser light on the incident end surface of the multimode optical fiber 4 is the substantially circular shape. On the other hand, the beam shape of the laser light which is obtained on the exit end surface of the multimode optical fiber 4 is a substantially square shape.

The laser light exited from the multimode optical fiber 4 is emitted to the spatial light modulating means 3. Because of the uniform spatial intensity distribution of the exited laser light, the illuminated surface of the spatial light modulating means 3 can be irradiated with the laser light without unevenness. The illuminated surface of the spatial light modulating means 3 has the square shape. The laser light can be emitted to the spatial light modulating means 3 at high light use efficiency because the beam shape of the exited laser light is the substantially square shape.

The spatial light modulating means 3 changes optical characteristics of a device in response to an input signal and locally modulates a beam of the emitted laser light to form an image. When transmission light or reflection light (transmission light of FIG. 8) from the spatial light modulating means 3 is projected to an auxiliary surface such as a screen, the speckle pattern temporally changes. Therefore, an image in which speckle is removed can be displayed. The laser light is emitted to the illuminated surface of the spatial light modulating means 3 without unevenness and the laser light is emitted to the spatial light modulating means 3 at high light use efficiency. Thus, a bright and uniform image can be displayed.

According to such a structure, even when the laser light is projected to the auxiliary surface such as the screen, the speckle pattern temporally changes, so the light source capable of efficiently removing the speckle is obtained.

The invention claimed is:

1. A speckle removing light source, comprising:
a light source for outputting laser light; and
light frequency modulation means for changing a wavelength of the laser light,
wherein:
the wavelength of the laser light outputted from the light source is temporally changed by the light frequency modulation means;
the light frequency modulation means has a predetermined period set for changing the wavelength of the laser light;
spatial light modulation is applied to the outputted laser light to produce an image, wherein the spatial light modulation has a period set for producing the image, and the period for producing the image is longer than the period for changing the wavelength of the laser light by the light frequency modulation means, and
the period for changing the wavelength of the laser light is set according to the period for producing the image.

2. The speckle removing light source according to claim 1, wherein the laser light outputted from the light source has a single mode which is a longitudinal mode.

3. The speckle removing light source according to claim 1, wherein the light frequency modulation means has the period set for changing the wavelength of the laser light, and the period is at least shorter than 20 msec.

4. The speckle removing light source according to claim 1, further comprising a multimode optical fiber which includes an internal core through which light propagates and has at least two light modes,
wherein the wavelength of the laser light outputted from the light source is temporally changed by the light frequency modulation means and the laser light propagates through the multimode optical fiber and is outputted therefrom.

5. The speckle removing light source according to claim 4, wherein a part of the core of the multimode optical fiber including a light exit end surface has a lateral cross section which is a substantially polygonal outer diameter shape.

6. A lighting apparatus, comprising:
a speckle removing light source comprising:
a light source for outputting laser light, and
light frequency modulation means for changing a wavelength of the laser light; and
spatial light modulating means for applying the spatial light modulation to the laser light outputted from the speckle removing light source to produce the image,
wherein:
the wavelength of the laser light outputted from the light source is temporally changed by the light frequency modulation means,
the light frequency modulation means has a predetermined period set for changing the wavelength of the laser light,
spatial light modulation is applied to the outputted laser light to produce an image,
the spatial light modulating means has a period set for producing the image, the period for producing the image being longer than the period for changing the wavelength of the laser light by the light frequency modulation means, and
the period for changing the wavelength of the laser light is set according to the period for producing the image.

7. A method, comprising:
outputting laser light from a light source;
applying light frequency modulation to temporally change a wavelength of the laser light; and
applying spatial light modulation to the outputted laser light to form an image,
wherein:
a predetermined period is set for changing the wavelength of the laser light according to the light frequency modulation,
another period is set for the spatial modulation to form the image, the period set for forming the image by the spatial light modulation being longer than the predetermined period set for changing the wavelength of the laser light by the light frequency modulation, and
the period for changing the wavelength of the laser light is set according to the period for forming the image.

8. The method according to claim 7, wherein the laser light outputted from the light source has a single mode which is a longitudinal mode.

9. The method according to claim 7, wherein the period set for changing the wavelength of the laser light is at least shorter than 20 msec.

10. The method according to claim 7, further comprising propagating the outputted laser light whose wavelength is temporally changed by the light frequency modulation through a multimode optical fiber which includes an internal core through which light propagates and has at least two light modes,
    wherein the laser light outputted from the multimode optical fiber is spatially modulated to form the image.

11. The method according to claim 10, wherein a part of the core of the multimode optical fiber including a light exit end surface has a lateral cross section which is a substantially polygonal outer diameter shape.

12. The method according to claim 7,
    wherein the applying step includes setting a period for producing the image, which is longer than the period for temporally changing the wavelength of the laser light by the light frequency modulation.

* * * * *